United States Patent [19]
Yoon

[11] 3,766,585
[45] Oct. 23, 1973

[54] DOCK PLATE

[75] Inventor: Young Z. Yoon, Des Moines, Iowa

[73] Assignee: Woodford Manufacturing Company, Des Moines, Iowa

[22] Filed: Apr. 27, 1971

[21] Appl. No.: 137,854

[52] U.S. Cl. .............................................. 14/72
[51] Int. Cl. ......................................... E01d 15/12
[58] Field of Search ................................ 14/71, 72

[56] References Cited
UNITED STATES PATENTS

| | | | |
|---|---|---|---|
| 479,533 | 7/1892 | Schultz | 14/71 |
| 1,137,645 | 4/1915 | McCormick | 14/72 |
| 1,993,261 | 3/1935 | Colgate | 14/71 |
| 2,473,126 | 6/1949 | Alexander | 14/71 |
| 2,473,127 | 6/1949 | Alexander | 14/71 X |
| 2,739,325 | 3/1956 | Grace | 14/72 |
| 3,122,764 | 3/1964 | Ambly | 14/72 X |
| 3,440,673 | 4/1969 | Kelley | 14/71 |
| 3,018,496 | 1/1962 | Hosbein | 14/71 |
| 3,411,169 | 11/1968 | Guerke | 14/71 |

Primary Examiner—Nile C. Byers, Jr.
Attorney—Zarley, McKee & Thomte

[57] ABSTRACT

A dock plate structure for bridging or spanning the space between a loading dock and a truck or railway car is disclosed herein. First and second spaced apart supports are secured to the loading dock and extend upwardly therefrom with first and second arms being pivotally secured at one end thereof to the lower ends of the first and second supports respectively. Each of the first and second arms have longitudinal extending slots formed therein which slidably receive opposite ends of a frame member extending between the arms. A dock plate is movably mounted on the frame member so that the dock plate can be moved with respect to the arms. Each of the supports have a spring means secured to the upper end thereof which extends downwardly therefrom. A cable is secured to each of the springs at the lower end thereof with the other end of the cable being secured to the outer end of the associated arm. Pulleys are rotatably mounted on the outer ends of the frame member with the associated cable extending around a portion of the respective pulley. The dock plate may be pivotally moved from an operative position to a storage position and vice versa and the spring means acts as a counter force against the weight of the dock plate. A modified form of the invention is also disclosed wherein a counterweight is employed in place of the spring means.

6 Claims, 10 Drawing Figures

INVENTOR
YOUNG Z. YOON
BY
Zarley, McKee & Thomte
ATTORNEYS

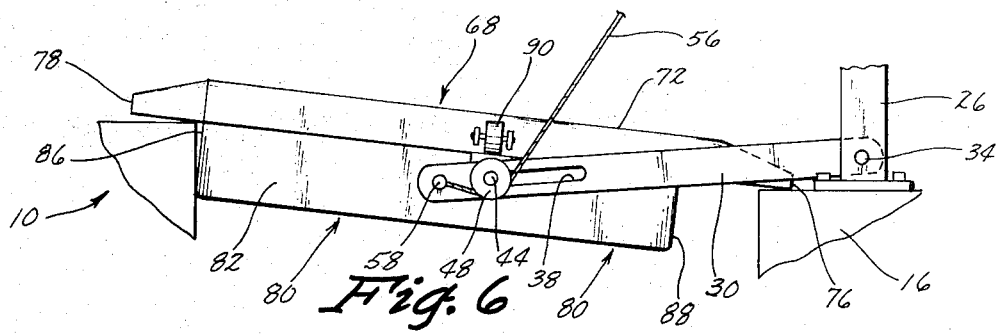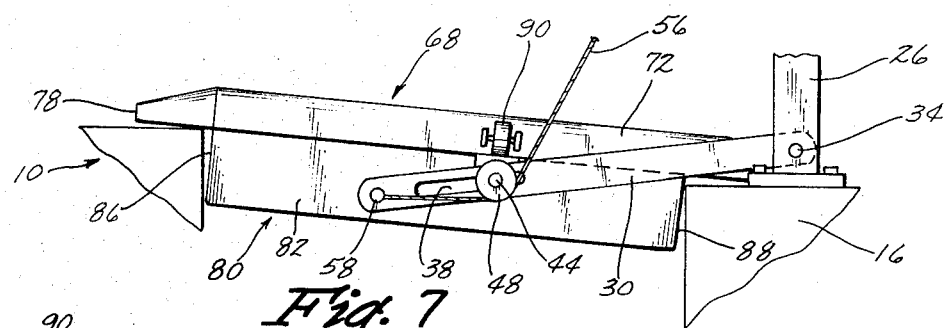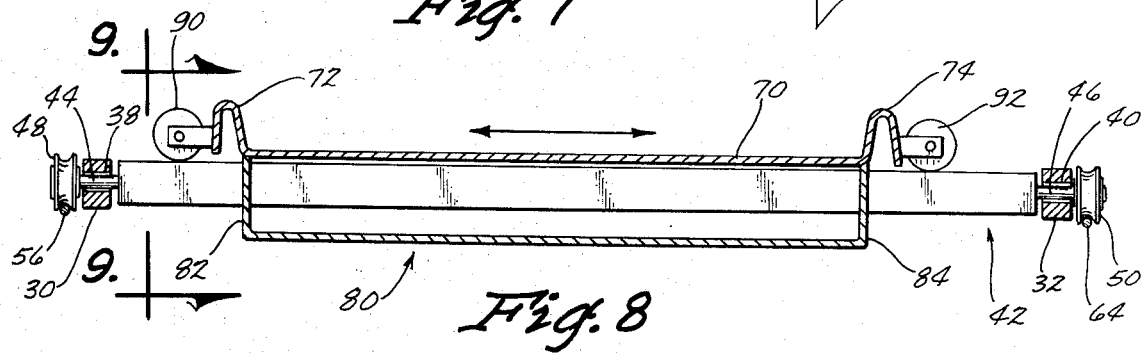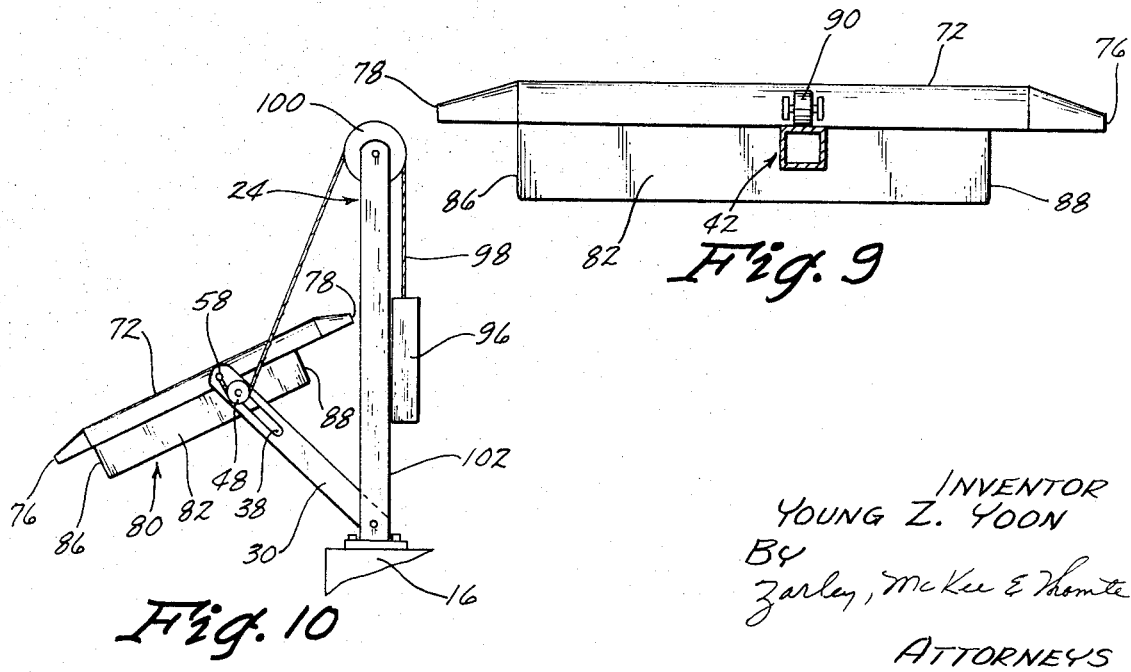

DOCK PLATE

Dock plates are commonly employed to bridge or span the space between a loading dock and a carrier vehicle such as a truck or railway car. The space or distance to be spanned may vary from vehicle to vehicle and it is important that the dock plate be securely positioned in place since "fork-lifts" and the like are driven thereover. The dock plates which are permanently mounted on the loading docks require that the door opening of the vehicle be precisely positioned with respect to the dock plate since one end of the dock plate is received in the door opening when the dock plate is moved to its operative position.

Therefore, it is a principal object of this invention to provide an improved dock plate.

A further object of this invention is to provide a dock plate having a counterweight provided thereon to assist in moving the dock plate between its operative and inoperative positions.

A further object of this invention is to provide a dock plate which is movably supported on the loading dock so that the dock plate can compensate for various span distances.

A further object of this invention is to provide a dock plate which is movably mounted on the loading dock to permit the dock plate to be moved laterally so that it may be aligned with the door opening of a vehicle.

A further object of this invention is to provide a dock plate which is convenient to use.

A further object of this invention is to provide a dock plate which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 6 is a side elevational view illustrating the dock plate spanning the space between a loading dock and a vehicle;

FIG. 7 is a view similar to FIG. 6 and which illustrates the dock plate spanning a narrower space than in FIG. 6;

FIG. 8 is a sectional view seen along lines 8—8 of FIG. 1;

FIG. 9 is a sectional view seen along lines 9–9 of FIG. 8; and

FIG. 10 is a view similar to FIG. 4 except a modified form of the invention is illustrated.

Figure 1:
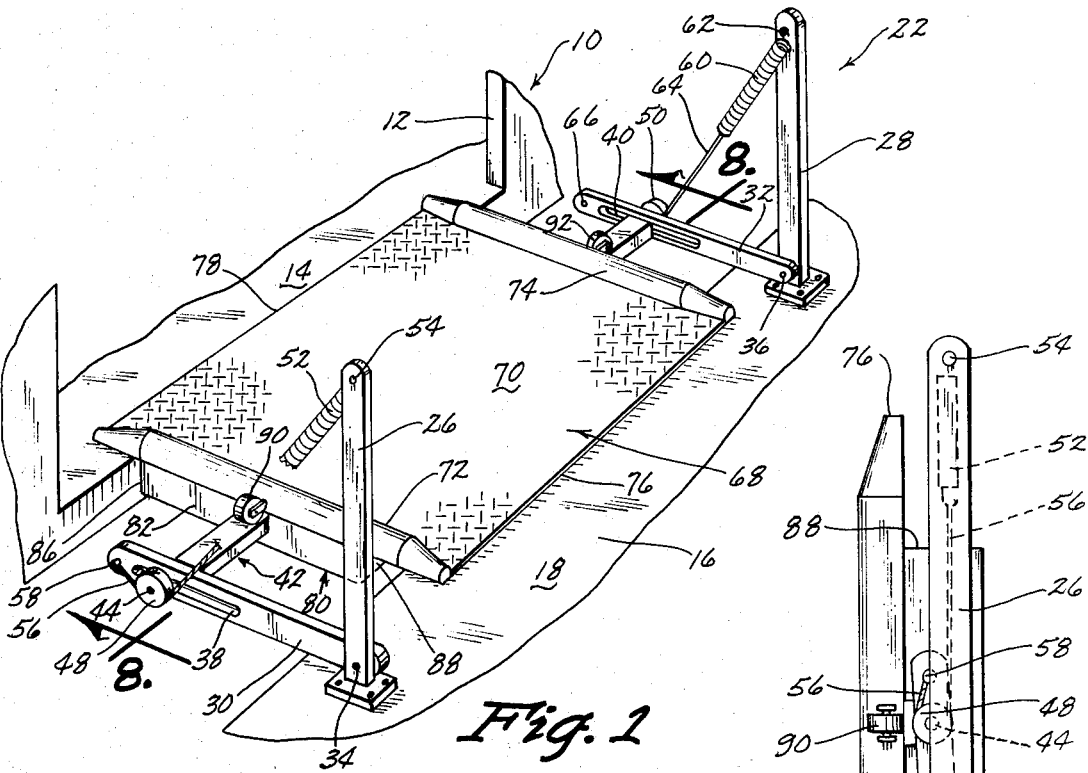
FIG. 1 is a partial perspective view illustrating the dock plate of this invention mounted on a loading dock and being positioned between the loading dock and a vehicle.

The numeral 10 refers generally to a carrier vehicle such as a railway car or truck having a door opening 12 and a floor surface 14. The numeral 16 designates a loading dock having a horizontal surface 18 and a vertically disposed end wall 20.

The dock plate of this invention is referred generally to by the reference numeral 22 while the numeral 24 identifies a modified form of the invention in FIG. 10. Dock plate 22 includes a pair of supports 26 and 28 which extend upwardly from the loading dock 16 in a spaced apart relationship and which have arms 30 and 32 pivotally secured thereto at 34 and 36 respectively. Arm 30 is provided with a longitudinally extending slot 38 formed therein while arm 32 is provided with a longitudinally extending slot 40 formed therein as seen in FIG. 1. A frame member 42 having shaft portions 44 and 46 extending from the opposite ends thereof extends between the arms 30 and 32 with the shaft portions 44 and 46 being received by the slots 38 and 40 respectively as seen in FIG. 8. Sheaves or pulleys 48 and 50 are rotatably mounted on the outer ends of the shaft portions 44 and 46 respectively outwardly of the arms 30 and 32 respectively.

Spring means 52 is connected at its upper end to the upper end of support 26 at 54 and has a cable 56 secured to its other end. Cable 56 extends around a portion of the sheave 48 as seen in the drawings and is secured to the outer end of arm 30 at 58. Spring means 60 is secured at its upper end to support 28 at 62 and has a cable 64 secured to its other end. Cable 64 extends around a portion of the sheave 50 and is secured to the outer end of arm 32 at 66.

The numeral 68 designates a dock plate including a floor platform portion 70, opposite sides or ribs 72 and 74, end portions 76 and 78, and box understructure 80. Understructure 80 includes vertically disposed sides 82 and 84 and vertically disposed ends 86 and 88. Frame member 42 extends through openings formed in sides 82 and 84 to permit the dock plate to be moved longitudinally along the length of the frame member 42. Rollers 90 and 92 are operatively connected to the sides 72 and 74 respectively as illustrated in FIG. 8 and roll upon the upper surface of frame member 42 to support the dock plate 68 on the frame member 42. The width of the dock plate 68 is less than the distance between the arms 30 and 32 so that the dock plate 68 may be laterally moved to properly position the same with respect to the door opening.

Figure 2:
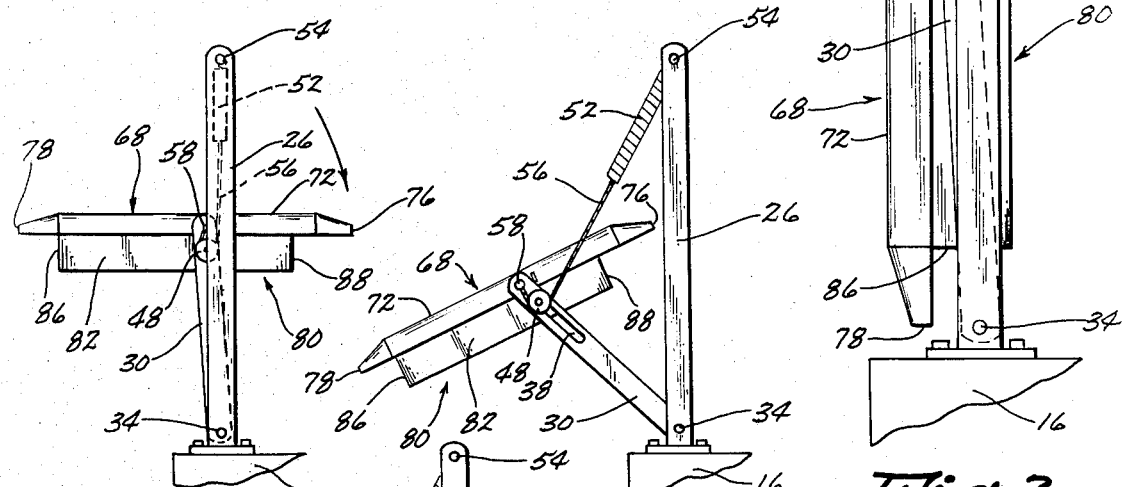
FIG. 2 is a side elevational view of the dock plate in its inoperative or storage position.
Figures 3, 4, 5:
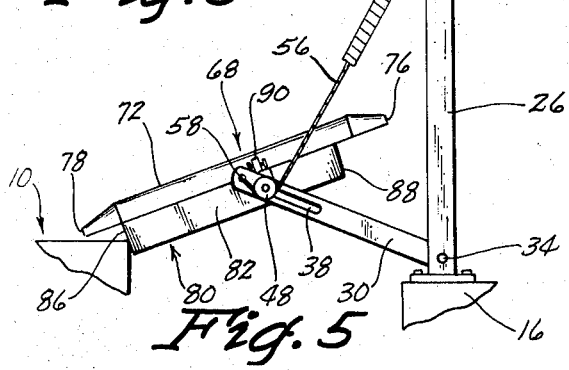
FIG. 3-5 are side elevational views similar to FIG. 2 illustrating the sequential steps in moving the dock plate from its storage position towards its operative position.

FIG. 2 illustrates the dock plate 68 in its stored or inoperative condition. Frame member 42 extends through the box understructure 80 upwardly of the center thereof as viewed in FIG. 2 so that the weight of the dock plate tends to cause the dock plate to position itself in the vertical position seen in FIG. 2 with the springs 52 and 60 also aiding in maintaining the arms 30 and 32 in the substantially vertical position seen in FIG. 2 to maintain the dock plate in its stored or inoperative position. FIG. 3 illustrates the first step that is taken when it is desired to move the dock plate 68 from its stored to operative positions. The dock plate 68 is rotated from the position of FIG. 2 to the position of FIG. 3 so that the dock plate 68 is substantially horizontally disposed. The rotation of dock plate 68 is permitted by the rotatable connection of the frame member 42 and the sheaves 48 and 50. Force is then applied against the dock plate 68 to cause the arms 30 and 32 to pivot downwardly from the position of FIG. 3 to the position of FIG. 4. The springs 52 and 60 serve as a counter force to prevent the dock plate 68 from freely falling downwardly from its stored position. The dock plate 68 is continued to be moved downwardly from the position of FIG. 4 until the end portion 86 of the box understructure 80 engages the side 94 of the vehicle 10. The dock plate 68 is then moved from the position of FIG. 5 to the position of FIG. 6 so that the end portion 76 of dock plate 68 rests upon the loading dock. FIG. 7 illustrates the loading dock 68 spanning a narrower distance than seen in FIG. 6 and it can be seen that the dock plate 68 compensates for the different distance due to the fact that the frame member 42 and the dock plate 68 have moved inwardly with respect to the arms 30 and 32. The dock plate 68 is also laterally movable on the frame member 42 so that the dock plate can be properly positioned with respect to the door opening 12 of the vehicle which eliminates the necessity of precisely positioning the vehicle with respect to the dock plate.

The dock plate 68 is easily moved from the operative position illustrated in FIG. 1 to the stored position of FIG. 2 since the springs 52 and 60 assist in pivoting the dock plate 68 upwardly from its substantially horizontal position. The resultant energy of the springs should be slightly less than the weight of the dock plate 68 to insure that the dock plate may be easily moved between its operative and inoperative positions and to insure that the dock plate will remain in place when so positioned.

FIG. 10 illustrates a modified form of the structure with the only difference being that a counterweight 96 is substituted for the spring means of the main embodiment and that the cable 98 extends over a pulley 100 positioned on the upper end of the support 102. FIG. 10 illustrates the counterweight structure at one side of the structure and it should be understood that a second counterweight would also be provided on the other support which is not shown in FIG. 10.

Thus it can be seen that an extremely versatile dock plate has been provided which may be adjusted either horizontally or laterally with respect to a carrier vehicle and which may easily be moved from its stored to operative positions and vice versa. Thus it can be seen that the dock plate accomplishes at least all of its stated objectives.

I claim:

1. A dock plate structure comprising, first and second support arms operatively secured to a loading dock, a dock plate means positioned between said first and second support arms, and connection means connecting said dock plate means to said support arms whereby said dock plate means is movable along the length of said support arms to permit said dock plate means to properly bridge the gap between a loading dock and a vehicle adjacent thereto, said connection means comprising a frame means having end portions movably secured to said arms, said dock plate means being operatively secured to said frame means, said end portions of said frame means comprising shaft portions, each of said arms having a longitudinally extending slot formed therein, said shaft portions rotatably extending through said slots, said first and second support arms being pivotally secured to first and second support means, respectively, which are adapted to be mounted on a loading dock, first and second pulley means rotatably mounted on said shaft portions respectively outwardly of said arms, and a first cable means secured at one end thereof to the other end of said first arm and partially extending around said first pulley means, a first spring means secured to and extending from said first support means adjacent the upper end thereof, the other end of said first cable means being secured to said first spring means, a second cable means secured at one end thereof to the other end of said second arm and partially extending around said second pulley means, a second spring means secured to and extending from said second support adjacent the upper end thereof, the other end of said second cable means secured to said second spring means.

2. A dock plate structure comprising, first and second support arms operatively secured to a loading dock, a dock plate means positioned between said first and second support arms, and connection means connecting said dock plate means to said support arms whereby said dock plate means is movable along the length of said support arms to permit said dock plate means to properly bridge the gap between a loading dock and a vehicle adjacent thereto, said connection means comprising a frame means having end portions movably secured to said arms, said dock plate means being operatively secured to said frame means, said end portions of said frame means comprising shaft portions, each of said arms having a longitudinally extending slot formed therein, said shaft portions rotatably extending through said slots, said first and second support arms being pivotally secured to first and second support means, respectively, which are adapted to be mounted on a loading dock, first and second pulley means rotatably mounted on said shaft portions respectively outwardly of said arms, a first cable means secured at one end thereof to the other end of said first arm and partially extending around said first pulley means, third and fourth pulley means rotatably mounted on the upper ends of said first and second supports respectively, said first cable means extending over said third pulley means, a first counterweight secured to the other end of said third pulley means, a second cable means secured at one end thereof to the other end of said second arm and partially extending around said second pulley means, said second cable means extending over said fourth pulley means, a second counterweight secured to the other end of said second cable means below said fourth pulley means.

3. A dock plate structure comprising, a support means operatively secured to a loading dock, first and second spaced apart support arms having first and second ends and being pivotally secured at their first ends to said support means, a dock plate means positioned between said support arms, said dock plate means having opposite sides and opposite ends, and connection means pivotally and movably connecting the opposite sides of said dock plate means to said support arms whereby said dock plate means may be pivotally moved about a horizontal axis with respect to said support arms and whereby said dock plate means may be moved longitudinally with respect to said support arms so that said dock plate means will automatically properly bridge the gap between a loading dock and a vehicle adjacent thereto.

4. The dock plate structure of claim 3 wherein each of said support arms has a longitudinally extending slot formed therein, said connection means comprising shaft portions rigidly connected to said opposite sides of said dock plate means and extending horizontally outwardly therefrom through said slots.

5. The dock plate structure of claim 4 wherein said support means comprises first and second spaced apart supports secured to the loading dock and extending upwardly therefrom, said first and second support arms being pivotally connected to said first and second supports adjacent the lower ends thereof, and yieldable force means interconnecting said first and second spaced apart supports adjacent the upper ends thereof with said first and second support arms respectively and with said shaft portions respectively.

6. The dock plate structure of claim 4 wherein said dock plate means includes a box understructure having an end portion adapted to engage the vehicle to cause said shaft portions to move in said slots to properly position said dock plate structure.

* * * * *